(No Model.)
D. H. GRANT & H. MILLER.
REVERSING GEAR FOR ENGINES.
No. 524,201. Patented Aug. 7, 1894.
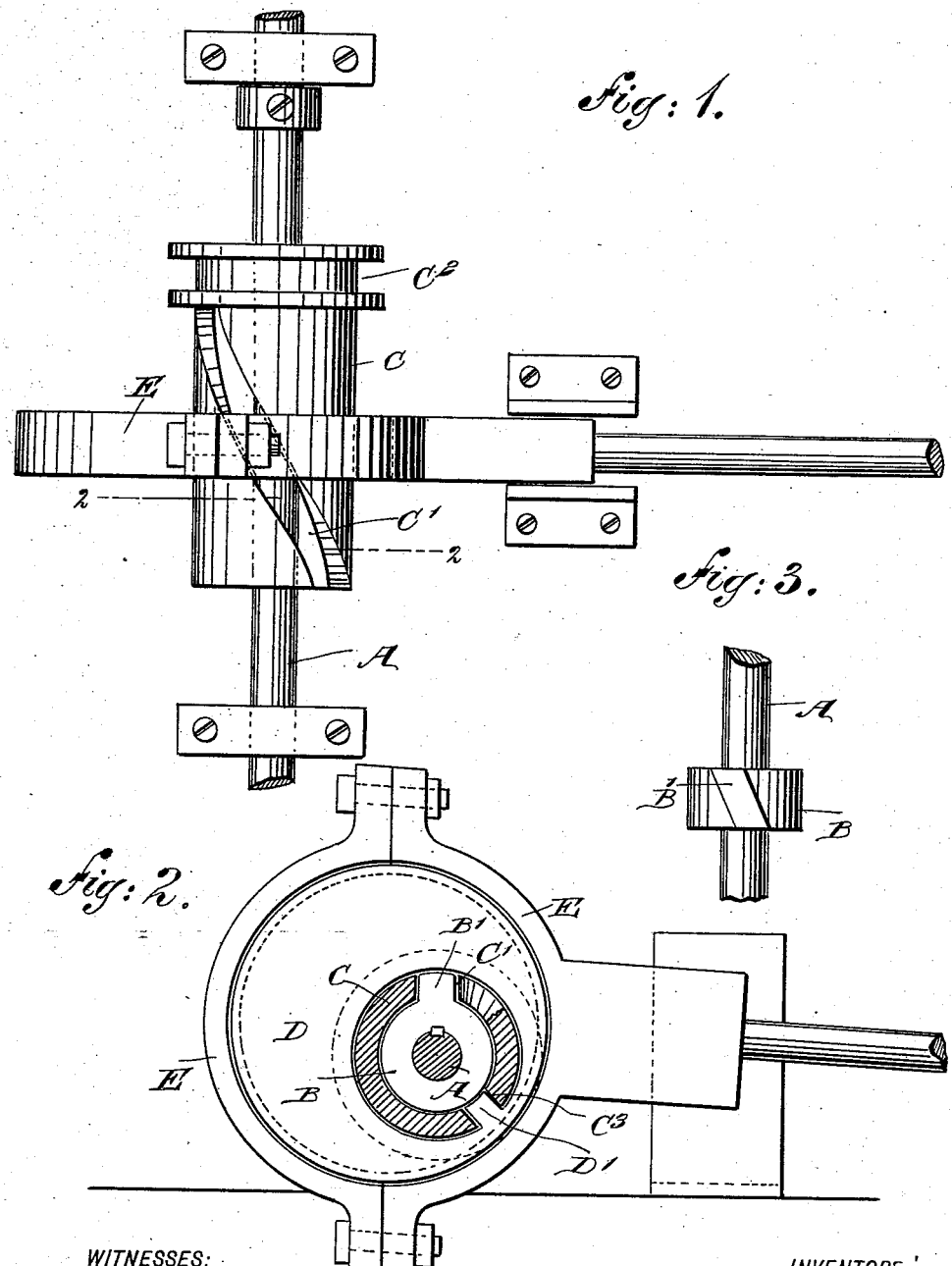
WITNESSES:
Chas. Nida
Theo. G. Hoster
INVENTORS:
D. H. Grant
H. Miller
BY
Munn & Co
ATTORNEYS.

UNITED STATES PATENT OFFICE.

DANIEL H. GRANT AND HENRY MILLER, OF RAYMORE, MISSOURI; SAID MILLER ASSIGNOR TO SAID GRANT.

REVERSING-GEAR FOR ENGINES.

SPECIFICATION forming part of Letters Patent No. 524,201, dated August 7, 1894.

Application filed March 31, 1894. Serial No. 505,840. (No model.)

*To all whom it may concern:*

Be it known that we, DANIEL H. GRANT and HENRY MILLER, both of Raymore, in the county of Cass and State of Missouri, have invented a new and Improved Reversing-Gear for Engines, of which the following is a full, clear, and exact description.

The object of the invention is to provide a new and improved reversing gear for engines, which is simple and durable in construction, very effective in operation, and arranged to permit the operator to readily reverse the engine under a full head of steam.

The invention consists of certain parts and details, and combinations of the same, as will be hereinafter described and then pointed out in the claim.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line 2—2 of Fig. 1; and Fig. 3 is a plan view of the collar on the shaft.

The engine on which the improvement is applied is provided with the usual main driving shaft A, on which is keyed or otherwise fastened a collar B, formed on its periphery with a lug B', adapted to engage a cam groove C', formed spirally in the peripheral wall of a sleeve C, mounted to slide transversely in alignment with the shaft A, the said sleeve being formed at one end with a suitable annular groove $C^2$, engaged by a shifting fork under the control of the operator, so as to permit the latter to slide the sleeve C transversely for reversing the engine, as hereinafter more fully described. In the cam sleeve C is also formed a transversely-extending straight slot $C^3$, engaged by a projection D', formed in the disk D, at the bore thereof, as plainly shown in Fig. 2, the disk D being engaged by the usual eccentric straps E of the eccentric connected with the valve mechanism of the engine.

Now, when the several parts are in the position illustrated in the drawings, and the operator shifts the sleeve C while the engine is running, then the cam groove C' on account of engaging the lug B' turns the sleeve and as its straight slot $C^3$ engages the lug D', it carries the eccentric disk around with it, whereby the said eccentric disk is shifted in the eccentric straps E, thus changing the position of the eccentric and consequently the position of the valves. It will also be seen that the sleeve C can be shifted at any time by the operator so as to move the eccentric and valves in any desired position.

Having thus fully described our invention, we claim as new and desire to secure by Letters Patent—

A reversing gear for engines, comprising a collar keyed on the main driving shaft and formed with a lug, a sleeve adapted to be shifted axially and circumferentially, and arranged concentric on the said shaft, the said sleeve being formed with a spiral cam groove and a straight slot, of which the spiral cam groove is engaged by the lug on the said collar, and an eccentric formed in the bore of its disk with a lug engaging the said straight slot in the sleeve, substantially as shown and described.

DANIEL H. GRANT.
HENRY MILLER.

Witnesses:
A. A. DANNER,
H. L. GRAY.